(12) United States Patent
Camillo

(10) Patent No.: US 9,360,681 B2
(45) Date of Patent: Jun. 7, 2016

(54) FIXING DEVICE FOR AN EYEGLASS FRAME FOR A PAIR OF LENSES

(71) Applicant: Rattaro Camillo, Genoa (IT)

(72) Inventor: Rattaro Camillo, Genoa (IT)

( * ) Notice: Subject to any disclaimer, the term of this patent is extended or adjusted under 35 U.S.C. 154(b) by 0 days.

(21) Appl. No.: 14/428,577

(22) PCT Filed: Sep. 16, 2013

(86) PCT No.: PCT/EP2013/002781
§ 371 (c)(1),
(2) Date: Mar. 16, 2015

(87) PCT Pub. No.: WO2014/044379
PCT Pub. Date: Mar. 27, 2014

(65) Prior Publication Data
US 2015/0234199 A1    Aug. 20, 2015

(30) Foreign Application Priority Data
Sep. 21, 2012   (IT) ............................. GE2012A0094

(51) Int. Cl.
*G02C 1/02*   (2006.01)

(52) U.S. Cl.
CPC ........................ *G02C 1/02* (2013.01)

(58) Field of Classification Search
CPC ............. G02C 1/02; G02C 5/146; G02C 5/16
USPC .................................. 351/110, 140, 149–152
See application file for complete search history.

(56) References Cited

U.S. PATENT DOCUMENTS

| 2,211,084 | A | 8/1940 | Styll |
| 5,073,020 | A | 12/1991 | Lindberg et al. |
| 5,274,404 | A | 12/1993 | Michael |
| 6,889,412 | B2 * | 5/2005 | Xie ........................ G02C 1/02 29/20 |
| 2005/0094091 | A1 | 5/2005 | Hsu |

FOREIGN PATENT DOCUMENTS

| DE | 20317415 U1 | 1/2004 |
| DE | 20320629 U1 | 11/2004 |
| EP | 0863423 A2 | 9/1998 |
| WO | 03/027757 A1 | 4/2003 |
| WO | 2005/019903 A2 | 3/2005 |

* cited by examiner

*Primary Examiner* — Huy K Mai
(74) *Attorney, Agent, or Firm* — Richard M. Goldberg

(57) ABSTRACT

Fixing device for an eyeglass frame for a pair of lenses (L), including at least a pair of protrusions (1, 1') made on the frame itself and corresponding holes (2, 2') spaced apart made on the lenses (L), in which the protrusions (1,1') are inserted so as to fix the frame to the lenses, the protrusions being made in the shape of a "V", with a first arm (11, 11') of the "V" constrained at one end to the frame and a second arm (111, 111') fitted with a free end capable of moving itself creating an elastic structure capable of expanding itself in the holes.

9 Claims, 1 Drawing Sheet

FIXING DEVICE FOR AN EYEGLASS FRAME FOR A PAIR OF LENSES

BACKGROUND OF THE INVENTION

This invention refers to a fixing device for the components of a pair of eyeglasses.

In particular this invention regards a fixing device for a pair of so-called frameless glasses, different to traditional ones, in which the lenses are inserted into specific rings that are an integral part of the frame, in that the lenses are directly bonded to the sidepieces and to the bridge.

In order to fix the sidepieces and the bridge directly to the lenses several technical solutions have been proposed. For instance, in the patent DE20320629, a system is proposed in which two small tubes linked to the frame structure by means of soldering are inserted in specific holes on the lens and held in position by means of dowels.

Although practical, such a system has a certain fragility in the points of soldering and besides it joins together rigid parts, subject to breakage.

Another solution is that described in the U.S. Pat. No. 5,073,020 in which means of support are envisaged, made up of a thread of metallic material suitably shaped, which is inserted in specific holes created on the edges of the lenses to remain hooked there.

Even this system does not allow one to have a stable and sure bond between the lenses and the components of the frame. What is more the structure does not result sufficiently elastic, and therefore able to avoid any possible breakages.

Another well known system is that described in the American Patent US2005/0094091 in which single holes created on the inner and outer sides of each lens house metallic arms with a connection at the end in the shape of a "U" and a locking device to block the lenses in position.

Nevertheless, even this solution does not also allow a stable connection of the frame to the lenses, in that said metallic arms are subject to movement inside the holes during the use of the eyeglasses with the possibility of unhooking and damage to the lenses.

SUMMARY OF THE INVENTION

The object of this invention is that of obviating such drawbacks supplying a fixing device having the characteristics of the claims.

The present invention concerns an improved fixing device of a frame to a pair of lenses for eyeglasses that allows a simple, stable and secure assemblage.

Furthermore, it allows one to keep the lenses in the correct position on the person wearing the glasses.

The invention includes a fixing device to the lenses made up of a pair of protrusions substantially in the shape of a "V", opportunely spaced one from the other, into which a first tapered arm, is substantially perpendicular with respect to the structure of the frame and is constrained to it at one of its ends and a second arm, of lesser thickness in comparison with the first, endowed with a free end able to move. Said first arm is united in a single body with no soldering to the components of the frame (bridge and supports of the sidepieces). Furthermore, said protrusions are specular with respect to a hypothetical vertical axle that divides them and they are inserted in a couple of special holes created on the inner and outer edges of the lenses. They are firmly held in position exploiting the elasticity and the expansive energy toward the surfaces of the lens supplied by the particular conformation in a "V" and the blocking of the free space between the two protrusions with the portion of lens between the two holes: therefore, the assemblage of the frame on the lenses results stable and secure and it does not require the application of a dowel and/or of soldering subject to easy breakage.

BRIEF DESCRIPTION OF THE DRAWINGS

The invention will be explained better through the following description, in which the form of preferred realization of the invention is described, done with aid of the figures attached which respectively illustrate.

DETAILED DESCRIPTION

Figure 1:
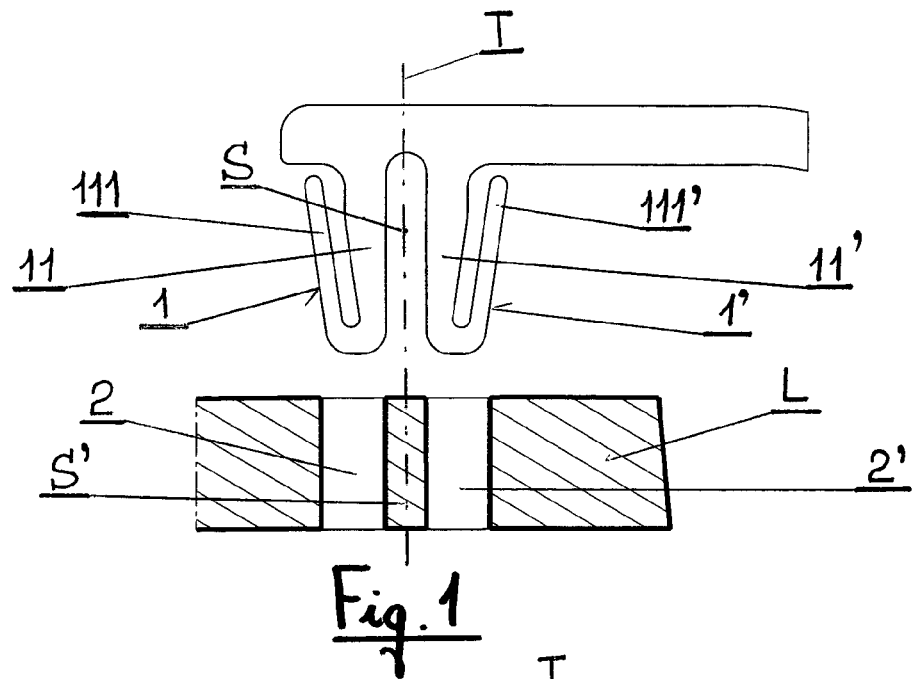
FIGS. 1, 2 and 3 illustrate the phases of assemblage of the fixing device to the lenses according to this invention.
Figure 2:
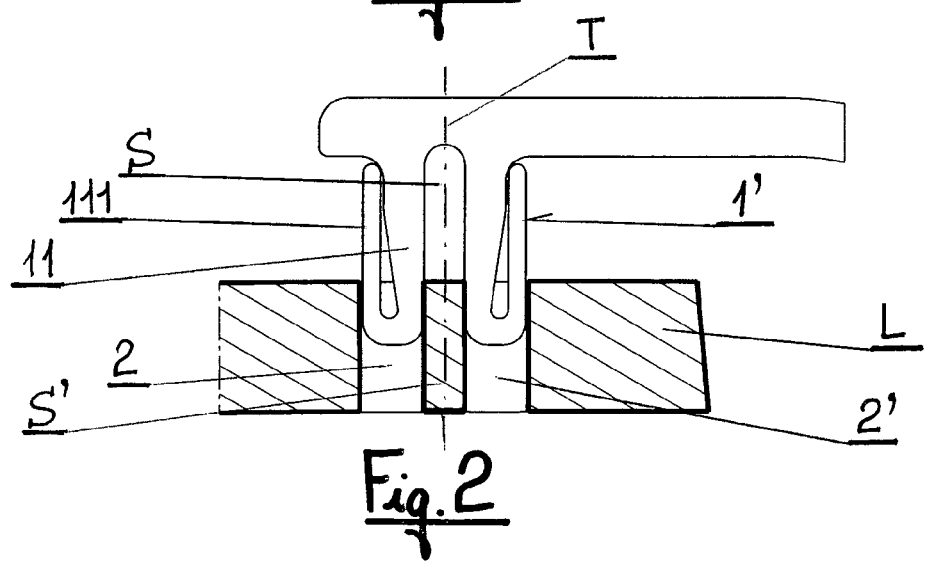
Figure 3:
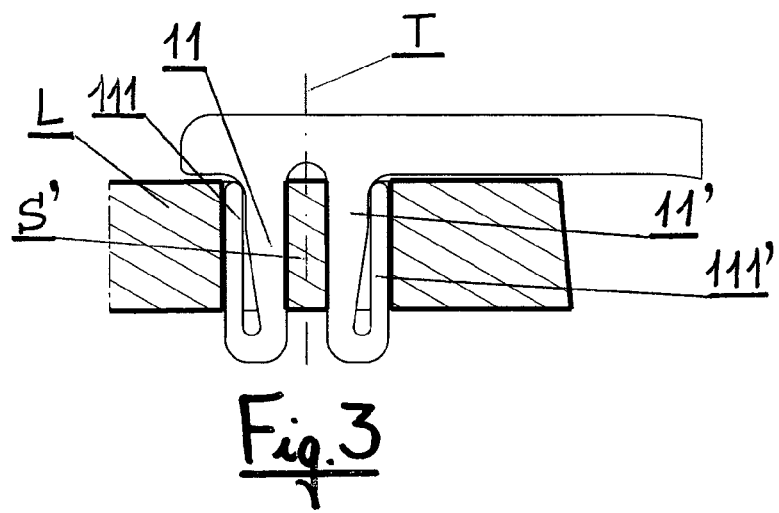

With reference to the aforesaid figures, the fixing device, according to this invention, includes a couple of protrusions in the shape of a "V" 1, 1', opportunely distanced from one another by a space S, in which a first tapered arm 11, 11', is joined to the bridge or to the support of the sidepieces and is substantially perpendicular with respect to the structure of the frame and a second arm 111, 111', of lesser thickness compared to the first one, which is free and, therefore, able to move. What is more, said protrusions 1, 1' are specular in comparison with a hypothetical vertical axle T that divides them and they are formed in a unique piece with the bridge and with the support of the sidepieces.

On the inner and outer edges of the lenses L a couples of holes 2, 2' are created in which such protrusions in the shape of a "V" 1, 1' can be inserted.

Particularly, such holes are substantially of dimensions analogous to those of the said protrusions and they are separated from each other by the space S.'

Furthermore, the space S between the two protrusions is smaller or equal to the space S' between the two holes.

The fixing of the eyeglass frame to the lenses takes place by inserting the couples of protrusions 1, 1' in the respective holes 2, 2' making an external thrusting pressure on the upper part of the frame so that the protrusions penetrate into the holes completely. Said protrusions, once inserted, firmly remain in position exploiting the expansive energy supplied by the particular conformation in a "V" of the aforesaid couple of protrusions 1, 1' on the surfaces of the lens and the blocking of the free space S set between the two protrusions 1, 1' and the portion of lens S' between the two holes.

In consideration, therefore, of the envisaging of a pair of holes close to one another and of the particular conformation of the protrusions, the fixing of the components of the frame to the lenses results firm and does not allow any annoying oscillations for anyone wearing a pair of glasses.

These protrusions 1, 1' are created, preferably, with flexible metallic or plastic material endowed with a certain elasticity.

Preferably, the protrusions of the bridge are two for each inner side of each lens and the protrusions of the supports of the sidepieces are two for each support, but they can be more than two.

A further advantage of this invention is represented by the fact that the protrusions, those of the bridge and those of the side supports for fixing of the sidepieces, are created in a unique body with the elements of the frame with no soldering by using a system of laser cutting, or other system known to those skilled in the art, of a metallic plate, or using the method of moulding in a special cast. In such way, said elements result rather resistant and elastic and, therefore, having no weakened zones subject to easy breakage.

In an alternative solution, the free arms of the protrusions 111,111' are turned toward the inner part of the device, rather than toward the outer part of it. Again, according to a further solution, the free arms of the protrusions 111, 111' are, respectively, one turned toward the inner part of the device and the other toward the outer part of it.

In an alternative solution compared to that illustrated in the Figures, the orientation of the holes on the lenses and of the respective couples of protrusions is arranged on a vertical rather than horizontal axis.

The solutions mentioned above have only been described to illustrate this invention, but they are not limitative of the object of it. Different modifications can be made to the above mentioned description without moving away from the objective of this invention.

What is claimed is:

1. Fixing device for an eyeglass frame to a pair of lenses bonded to sidepieces and to a bridge of the eyeglass frame, comprising:
    spaced apart holes in the lenses;
    at least one pair of protrusions on the eyeglass frame which are inserted into the spaced apart holes so as to fix the frame to the lenses,
    said protrusions have a body formed as a one-piece member with the frame and having "V" shape with a first arm of each "V" shaped protrusion constrained at one end to the frame and a second arm of each "V" shaped protrusion at an opposite end thereof, having a free end adapted to move, to creating an elastic structure adapted to expand in said holes.

2. Fixing device according to claim 1, wherein the first arm of each said "V" shaped protrusion is tapered.

3. Fixing device according to claim 1, wherein the first arm of each said "V" shaped protrusion is oriented substantially perpendicular to the frame.

4. Fixing device according to claim 1, wherein the holes are similar in size to the protrusions.

5. Fixing device according to claim 1, wherein the frame and the protrusions are made from one of:
    a flexible metallic material and
    a flexible plastic material.

6. Fixing device according to claim 1, wherein the protrusions are specular relative to one other with respect to a hypothetical vertical axis which divides the protrusions.

7. Fixing device according to claim 1, wherein a space between two adjacent protrusions is smaller or equal to a space between two adjacent holes.

8. Fixing device according to claim 1, wherein the free ends of the second arms of the protrusions are turned toward an inner part of the device.

9. Fixing device according to claim 1, wherein the free ends of the second arms of the protrusions are oriented so that the free end of one second arm is turned toward an inner part of said device and the free end of an adjacent second arm is turned toward an outer part of said device.

\* \* \* \* \*